Nov. 22, 1938.　　　　N. SINITZIN-WHITE.　　　　2,137,630
SLIDE RULE
Filed Jan. 3, 1936　　　　3 Sheets-Sheet 1
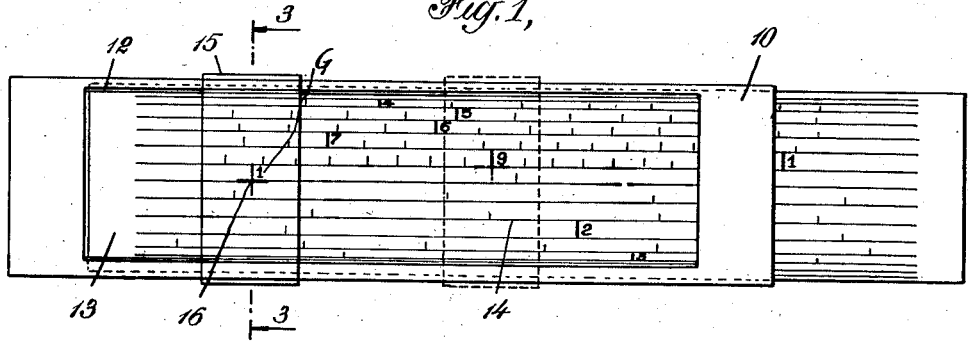
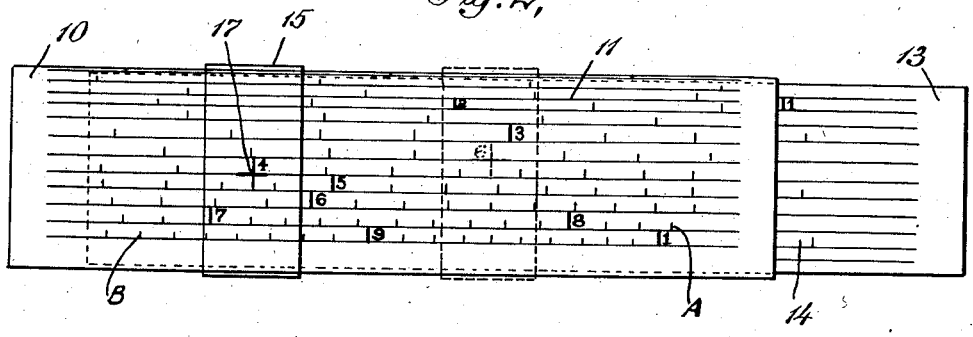
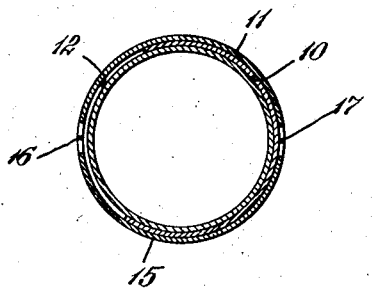
INVENTOR
Nicholas Sinitzin-White
BY
Pennie Davis Marvin Edmonds
ATTORNEYS Nov. 22, 1938.  N. SINITZIN-WHITE  2,137,630
SLIDE RULE
Filed Jan. 3, 1936  3 Sheets-Sheet 2

INVENTOR
Nicholas Sinitzin-White
BY
Pennie Davis Marvin & Edmonds
ATTORNEYS

Nov. 22, 1938.  N. SINITZIN-WHITE  2,137,630
SLIDE RULE
Filed Jan. 3, 1936   3 Sheets-Sheet 3
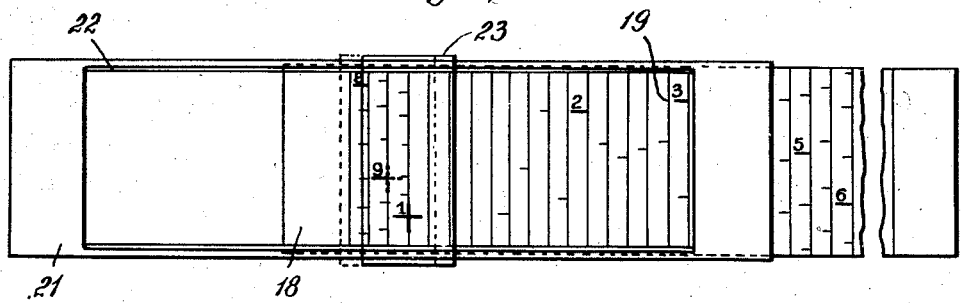
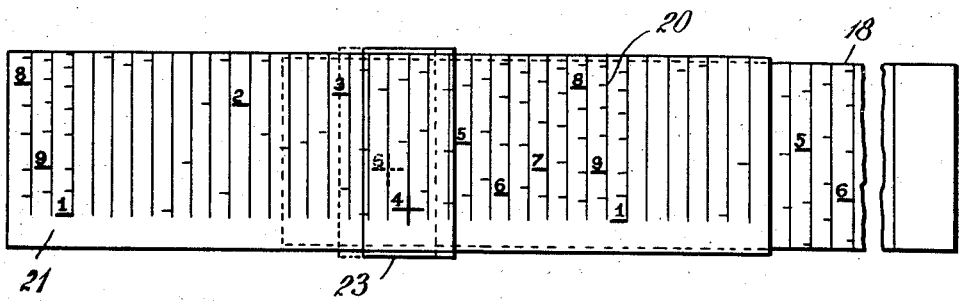
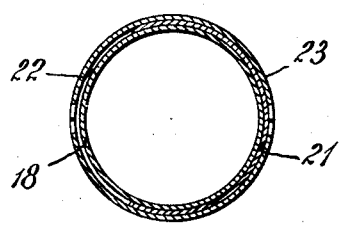
INVENTOR
Nicholas Sinitzin-White
BY
Pennie Davis Marvin & Edmonds
ATTORNEYS Patented Nov. 22, 1938

2,137,630

UNITED STATES PATENT OFFICE 2,137,630

SLIDE RULE

Nicholas Sinitzin-White, Westport, Conn., assignor of one-third to John L. R. Glover, Fairfield, Conn., and one-third to Nicholas N. Solovioff, Milford, Conn.

Application January 3, 1936, Serial No. 57,349

5 Claims. (Cl. 235—70)

This invention relates to slide rules and has particular reference to a novel slide rule of the cylindrical type which may be used to perform accurate calculations, and which is simple and compact in construction and adapted for manufacture at a low cost.

Slide rules of the cylindrical type, as commonly made, are of two forms. One form includes a cylinder having a logarithmic scale arranged on its surface in a helical line, and a member threaded on the cylinder and having a second logarithmic scale arranged in a helix for cooperation with the scale on the cylinder. With this construction, the two cooperating logarithmic scales extend in adjacent helical lines which are considerably longer than the rule, and accordingly the same degree of accuracy may be obtained as with a much longer slide rule of the ordinary type. However, the screw threaded engagement between the two members bearing the scales renders the operation of the slide rule slower and more difficult than with the ordinary slide rule because it requires the relative turning of these members a considerable number of times to bring them to the proper relative longitudinal positions for performing a calculation.

Another form of slide rule of the cylindrical type comprises a cylinder mounted in an envelope for rotational and longitudinal movement, the envelope consisting of a series of bars spaced around the periphery of the cylinder and extending parallel to the axis thereof. A logarithmic scale is arranged on the surface of the cylinder in spaced parallel lines which are visible between the bars of the envelope, and the bars are provided with logarithmic graduations which make up a scale cooperating with the scale on the cylinder. Since the length of a complete scale on the cylinder and bars is much greater than the length of these members, the slide rule is correspondingly more accurate than an ordinary slide rule of the same length. The cost of these slide rules, however, is greatly in excess of the cost of the ordinary slide rules because of the arrangement of bars forming the envelope which generally requires separate stamping operations for each bar and careful adjustment of the bars, and accordingly the use of these slide rules has been relatively limited. Also, the bars of the envelope obstruct the view of the scale on the cylinder when the cylinder is rotated, thereby rendering the device less adaptable for ready adjustment of the two scales.

The present invention is directed to the provision of a novel cylinder slide rule which may be manufactured at substantially the cost of the ordinary slide rule, and which permits ready adjustment of the two cylindrical members and affords an unobstructed view of the scales used in performing the calculating operations.

The new slide rule comprises a cylindrical casing having logarithmic graduations arranged on its surface in successive parallel lines to form a scale extending partly around the circumference of the casing. Mounted in the casing for rotational and longitudinal movement therein is a cylindrical member having logarithmic graduations arranged in parallel lines for cooperation with the scale on the casing. The casing is constructed to expose the graduations on the inner cylinder through a part of the casing circumferentially spaced from the outer scale, and to this end I prefer to provide the casing with an opening circumferentially spaced from the scale thereon and of sufficient size to expose a complete scale on the inner cylinder. Preferably, the inner cylinder has two or more logarithmic scales arranged in successive parallel lines whereby a complete scale appears in the opening in the casing as the inner cylinder is rotated. A cursor is mounted on the casing for rotational and longitudinal movement thereon and is provided with spaced points for measuring a fixed circumferential distance around the casing between the cooperating scales.

It will be apparent that in the new slide rule, the cooperating scales on the casing and inner cylinder appear at two different parts of the casing which are circumferentially spaced, and accordingly the outer scale does not obstruct the view of the scale on the inner cylinder during the calculating operations. The cursor provides spaced reference marks which may be adjusted relatively to the outer scale to indicate the proper angular positions of the inner cylinder with respect to the casing for correlating the graduations on the cooperating scales. The successive lines of graduations on the cylinders may be arranged in closely adjacent relation without the usual spacing which is characteristic of other slide rules of the cylindrical type, and by so arranging the graduations, the cylinders may be made of relatively small proportions to form a small compact device. The lines of graduations forming the scales may be arranged to extend either parallel or perpendicular to the axes of the cylinders, as will appear more fully in the detailed description to follow.

For a better understanding of the invention, reference may be had to the accompanying drawings, in which Figure 1 is a side view of one form of the new device.

Figure 2 is a view of the opposite side of the device shown in Figure 1.

Figure 3 is a section on the line 3—3 of Figure 1.

Figure 4 is a development of the inner cylinder of the device illustrated in Fig. 1, showing the outline of the opening in the outer cylinder through which the graduations on the inner cylinder are viewed.

Figure 5 is a development of the inner cylinder of a modified form of the device, showing the outline of the opening in the outer cylinder through which the graduations on the inner cylinder are viewed.

Fig. 6 is a side view of the modified form in which the graduations on the inner cylinder are arranged in the manner shown in Fig. 5.

Fig. 7 is a view of the opposite side of the device shown in Fig. 6; and

Fig. 8 is a section on the line 8—8 in Fig. 6.

In the drawings, the numeral 10 designates a cylindrical casing having logarithmic graduations 11 arranged on its cylindrical surface in lines extending parallel to the axis of the casing. The lines of graduations are arranged successively in closely adjacent relation to form a complete logarithmic scale which extends partly around the circumference of the casing, as shown in Fig. 2.

The scale of graduations 11 may be conveniently divided into parallel rows of equal length, as shown in Fig. 2, and arranged in such a manner that corresponding ends of the rows forming a complete scale are on a common line perpendicular to the rows. Thus, as seen in Fig. 2, one end of the rows forming a complete scale may be considered as defined by a vertical line passing through the third graduation, designated A, following the number "8" near the right end of the casing, and the other end of the rows by a vertical line passing through the seventh graduation, designated B, preceding the number "9" near the left end of the casing, so that there are exactly the usual ten divisions between the numbers "8" and "9" within the two vertical lines. The right end of each of the rows thus defined by the vertical lines through points A and B will then be of the same value in the scale as the left end of the row directly beneath. The portion of each row extending to the right of the vertical line through point A will duplicate that portion of the next lower line following the vertical line through point B, while the portion of each row to the left of or preceding the vertical line through point B will duplicate that portion of the row directly above which precedes the vertical line through point A. In the illustrated embodiment, a complete scale on the casing is represented by the numbers from "1" to "10" and the intermediate graduations, the number "10" being represented by the numeral "1" located at the end of the scale near the right end of the casing (Fig. 2), and the number "1" (not shown) being located near the left end of the casing at the beginning of the scale. It will be understood, however, that other forms of scales may be used and that the scale may be arranged in a manner differing from that illustrated, to suit particular requirements.

Figures 4, 5:
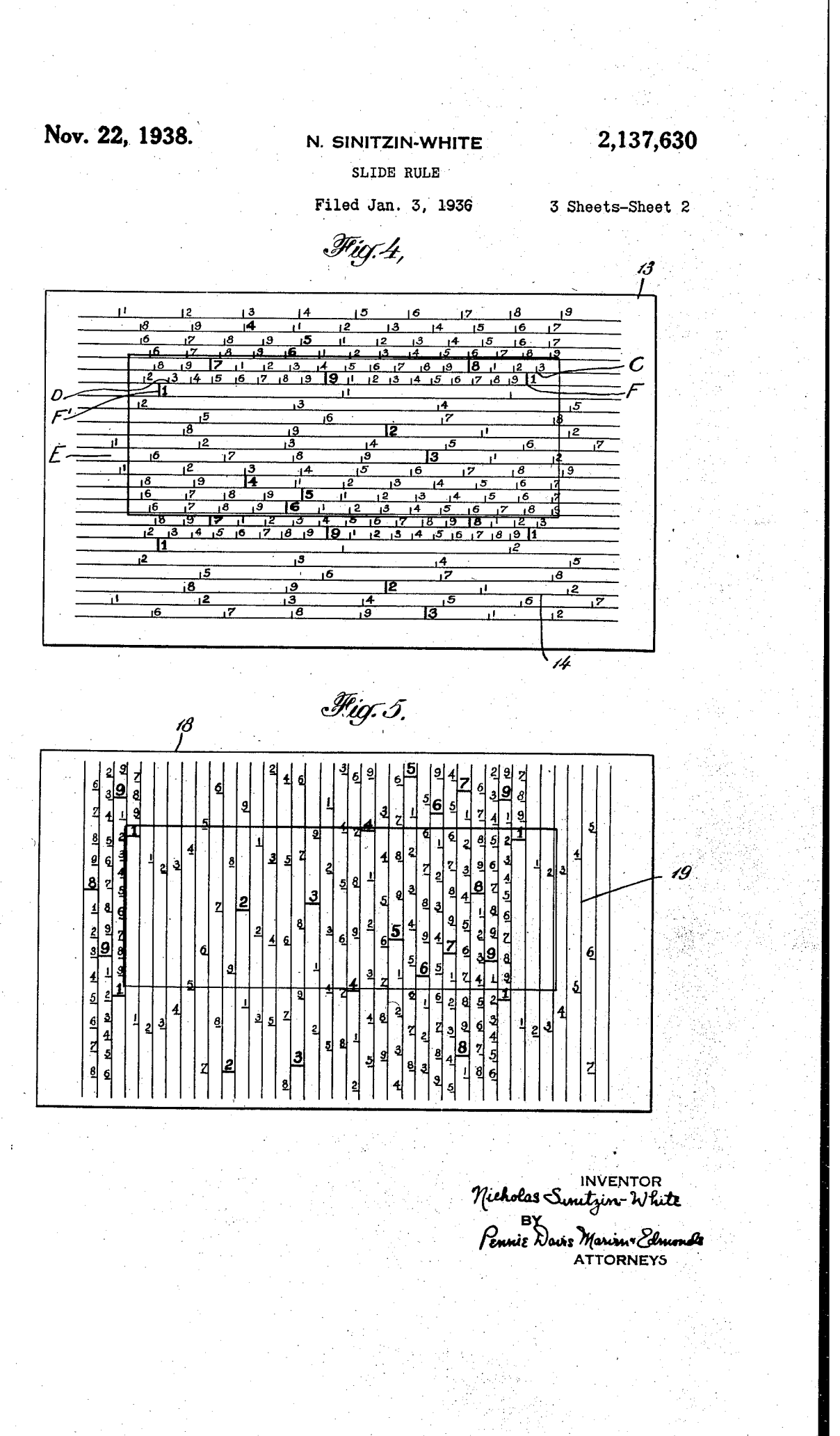

Circumferentially spaced from the scale formed by the graduations 11 is an opening 12 in the cylindrical surface of the casing, the opening being rectangular in form and of substantially the same size as the area occupied by the graduations 11. The casing 10 is open at its ends and has mounted therein a cylindrical member 13 which is adapted to slide and rotate in the casing. The member 13 has logarithmic graduations 14 arranged on its surface in lines parallel to the axis of the member, the graduations forming two complete logarithmic scales extending substantially around the circumference of the member, as illustrated in the development of the inner cylinder shown in Fig. 4.

The distances between corresponding graduations on the casing and inner cylinder are the same, as shown in Figs. 1, 2 and 4, and the rows on the inner cylinder are arranged in substantially the same manner as those on the casing except that there are sufficient additional rows on the inner cylinder to form two complete scales. Thus, on the inner cylinder, exactly two complete scales are included between a vertical line through a graduation near the right end of the cylinder and a vertical line through the corresponding graduation near the left end thereof. Taking a specific example, two complete scales are included between a vertical line through the third subdivision, designated C, following the large numeral "8" near the right end of the inner cylinder, and a vertical line through the seventh graduation, designated D, preceding the large numeral "9" near the left end of the inner cylinder. The parts of the rows outside of these vertical lines will be duplicate parts of the scales within the lines, as described in connection with the scale 11 on the casing.

The graduations 14 correspond to the graduations 11 on the casing and are visible through the opening 12 which is of sufficient size to expose a complete logarithmic scale on the inner cylinder when the opening is disposed over the graduations 14, as shown in outline in Figure 4. The casing 10 and cylindrical member 13 may be made of composition board, hard rubber, metal or the like, and are made to fit tightly one within the other to hold the cylindrical member frictionally against accidental movement in the casing.

It will be understood that each of the large numerals "1" in the scales of graduations on the inner cylinder 13 is the beginning or ending of a complete scale of graduations. As shown in Fig. 4, the first row of graduations on the inner cylinder does not mark the beginning of a complete scale of graduations but is an intermediate portion of a complete scale. A complete scale of graduations, however, is included between the top row of graduations in Fig. 4 and the twelfth row E from the top, inclusive. The beginning of this complete scale is at the large numeral "1", designated F, or the corresponding numeral "1", designated F', near the opposite end of the cylinder, and the scale progresses down to the twelfth row E and then up to the top row, and from the latter back to the large numeral "1" at F or F', designating the end of the scale. It will be observed that another complete scale identical with the first is included in rows 13 to 24, inclusive on the inner cylinder.

The scales formed by the graduations 14 on the inner cylinder are adapted to cooperate with the scale on the casing 10, and in order that the graduations on the cooperating scales may be correlated, I provide the casing with a cursor 15 in the form of a ring mounted on the casing for rotational and longitudinal movement thereon. The cursor 15 has a pair of circumferentially spaced reference marks 16 and 17 formed by vertical and horizontal hair lines, the reference marks being spaced so that one of the marks 16 overlies the opening 12 when the other mark 17 is moved to different positions over the scale on the casing. Preferably, the reference marks 16 and 17 are spaced 180° apart to measure equal circumferential distances on both sides of the cursor, whereby either of the marks will appear in the opening 12 when the other overlies the graduations 11 on the casing.

In the operation of the new slide rule, the cylindrical member 13 is used as the slide of an ordinary slide rule, the graduations on the inner cylinder 14 being correlated with those on the casing by means of the reference marks 16 and 17 on the cursor. For example, in performing multiplications, the cursor is adjusted to place the reference mark 17 over the graduation on the casing corresponding to one of the factors to be multiplied, the cylindrical member 13 is adjusted in the casing to bring the starting point G of a scale under the other reference mark 16, as shown in Fig. 1, and the cursor is then moved to place the reference mark 16 over the graduation appearing in the opening 12 which corresponds to the other factor to be multiplied, the product of the factors appearing on the casing under the reference mark 17. Divisions are performed by moving the cursor to bring the reference mark 17 over the graduation on the casing corresponding to the dividend, adjusting the member 13 so that a graduation thereon corresponding to the divisor appears under the other reference mark 16, and moving the cursor to a position where the reference mark 16 overlies the starting point of a scale appearing in the opening 12. The quotient will then appear on the casing under the reference mark 17.

Assuming, for example, that it is desired to multiply the number 4 by the number 9, the cursor is moved to place the reference mark 17 over the larger graduation "4" on the casing (Fig. 2), and the cylindrical member 13 is moved in the casing to bring one of the large numerals "1" under the other reference mark 16 as shown in Fig. 1. The cursor is then moved to place the reference mark 16 over the large numeral "9" appearing on the inner cylinder in the opening 12, as shown in dotted lines in Fig. 1. The product of the factors appears on the casing under the reference mark 17, namely, at "36", as shown in dotted lines in Fig. 2.

Divisions are performed by the reverse operation. That is, assuming that the number 36 is to be divided by 9, the cursor is adjusted to move the reference mark 17 over the graduation corresponding to the number "36", as shown in dotted lines in Fig. 2, and the inner cylinder 13 is adjusted so that the numeral "9" thereon underlies the reference mark 16 in the opening 12, as shown in dotted lines in Fig. 1. The cursor is then moved to the left to bring the reference mark 16 over the numeral "1" appearing in opening 12, as shown in full lines in Fig. 1, and the answer appears on the casing 10 under the reference mark 17 on the cursor, namely, at the numeral "4", as shown in full lines at Fig. 2.

If desired, the rows of graduations may be arranged circumferentially with respect to the casing and inner cylinder of the slide rule, as shown in the modification illustrated in Figs. 5 to 8, inclusive. As shown in Fig. 5, the inner cylinder 18 is provided with graduations 19 arranged in successive lines extending circumferentially around the member to form two complete logarithmic scales. The graduations 20 on the casing 21 are arranged in a manner similar to the graduations 19 to form a logarithmic scale adapted to cooperate with the graduations 19, the opening 22 in the casing being sufficiently large to expose a complete scale on the inner member 18, as shown in outline in Figure 5. Mounted on the casing 21 is a cursor 23 similar to the cursor 15 shown in Figs. 1 to 3. The slide rule is operated in the same manner as the rule shown in Figs. 1 to 3, as will be readily understood. In Figs. 6 and 7, the cursor is shown in dotted lines in the position corresponding to the position of the cursor shown in dotted lines in Figs. 1 and 2, which position was referred to in the description of the operation of the device in solving a specific problem.

It will be observed that with this construction, the graduations on the inner cylinder appear in a single opening 12 in the casing which affords a clear view of a complete logarithmic scale. By arranging the logarithmic scales in parallel lines, the effective length of a complete scale is made considerably greater than the length of the cylindrical members, and the cursor may be moved between extreme positions on the scales more rapidly and with less effort than in the ordinary slide rule, since the movement of the cursor along the scales is effected partly by rotation of the cursor. The operation of the device requires the use of only a single scale on the casing which may be arranged in closely adjacent lines over a narrow area whereby the casing may be made of small diameter to fit the pocket of the user. The device may be manufactured at a low cost, since the scales may be stamped on each of the cylinders in a single operation and the parts assembled without the usual adjustments.

While I have described and illustrated one form of my invention, it is to be understood that the invention may be embodied in constructions differing from that described while retaining its distinctive features. The casing if desired may be made of glass or other transparent material and the logarithmic graduations may be disposed in various other arrangements within the scope of the invention.

I claim:

1. A slide rule comprising a cylindrical casing having a logarithmic scale arranged in rows on the cylindrical surface thereof, a cylindrical member mounted in said casing for rotational and longitudinal movement relative thereto and having a logarithmic scale arranged in rows parallel to said rows on the casing for cooperation with said scale on the casing, the scale on said member being visible through a part of the casing circumferentially spaced from the area occupied by said scale on the casing, and means rotatably mounted on the casing and movable longitudinally with respect thereto for measuring a fixed circumferential distance between the scales on said casing and member to correlate the graduations thereof.

2. A slide rule comprising a cylindrical casing having a logarithmic scale arranged in parallel lines on the cylindrical surface thereof and an opening in said surface circumferentially spaced from the area occupied by said scale, a cylindrical member mounted in the casing for rotational and longitudinal movement relative thereto and having a logarithmic scale arranged in lines parallel to said lines on the casing for cooperation with said scale on the casing, the scale on said member being visible through said opening, and means rotatably mounted on the casing and movable longitudinally with respect thereto for measuring a fixed circumferential distance between the scales on said casing and member to correlate the graduations thereof.

3. A slide rule comprising a cylindrical casing having a logarithmic scale arranged on the cylindrical surface thereof in lines extending substantially parallel to the axis of the casing, a cylindrical member mounted in said casing for rotational and longitudinal movement relative thereto and having a logarithmic scale arranged in lines parallel to said lines on the casing for cooperation with said scale on the casing, the scale on said member being visible through a part of the casing circumferentially spaced from the area occupied by said scale on the casing, and means rotatably mounted on the casing and movable longitudinally with respect thereto for measuring a fixed circumferential distance between the scales on said casing and member to correlate the graduations thereof.

4. A slide rule comprising a cylindrical casing having a logarithmic scale arranged on the cylindrical surface thereof in lines extending substantially perpendicular to the axis of the casing, a cylindrical member mounted in said casing for rotational and longitudinal movement relative thereto and having a logarithmic scale arranged in lines parallel to said lines on the casing for cooperation with said scale on the casing, the scale on said member being visible through a part of the casing circumferentially spaced from the area occupied by said scale on the casing, and means rotatably mounted on the casing and movable longitudinally with respect thereto for measuring a fixed circumferential distance between the scales on said casing and member to correlate the graduations thereof.

5. A slide rule comprising a surface having graduations thereof arranged in parallel rows, a second surface overlying said first surface and movable relative thereto in two directions at substantially right angles, said second surface having graduations arranged over a portion thereof in rows parallel to corresponding rows on the first surface, means for exposing the graduations on said first surface through a portion of said second surface spaced from the last row of graduations thereon, and means mounted on said second surface and movable parallel and at right angles to the rows thereon for measuring a fixed distance between the rows on said surfaces to correlate the graduations thereof.

NICHOLAS SINITZIN-WHITE.